Patented Jan. 31, 1933

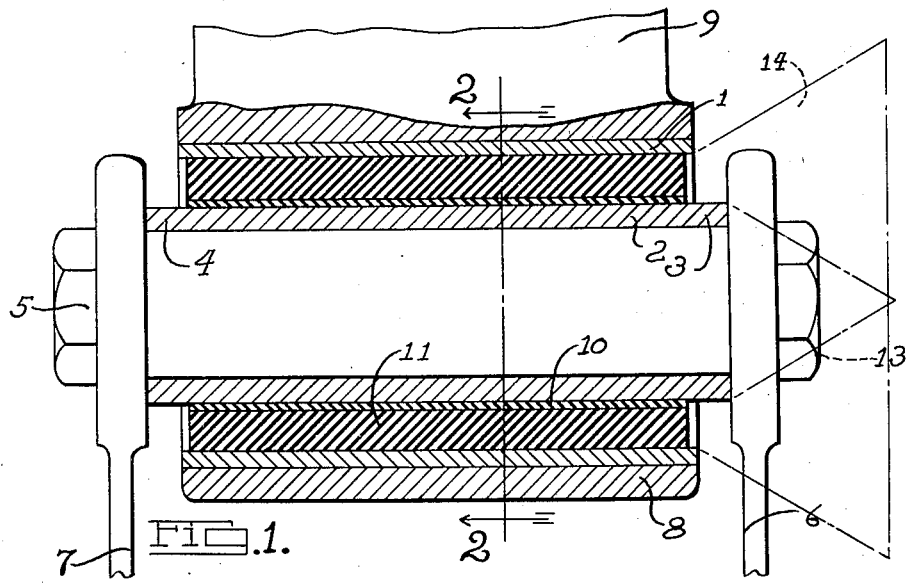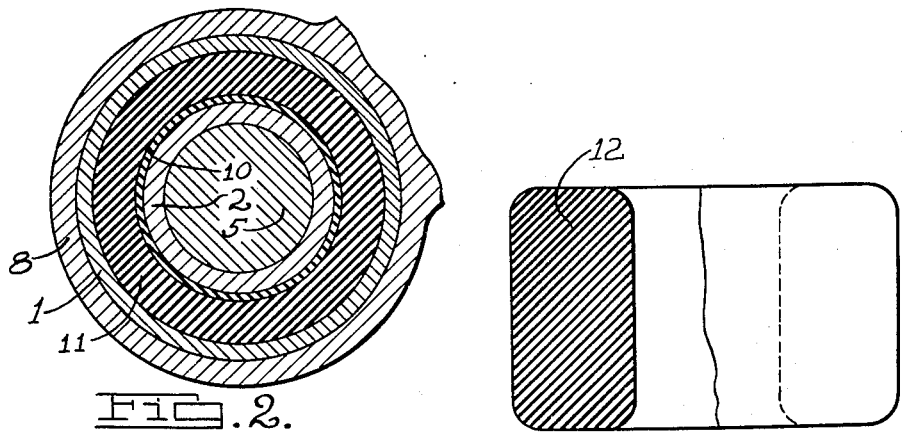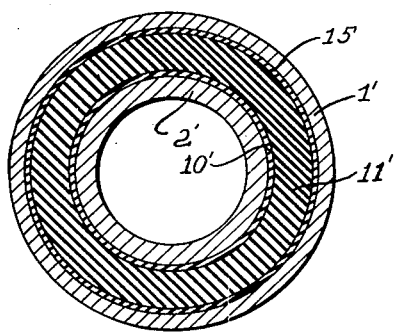

1,895,663

UNITED STATES PATENT OFFICE

CARROLL L. HUMPHREY, OF DETROIT, AND ROGER K. LEE, OF HIGHLAND PARK, MICHIGAN, ASSIGNORS TO CHRYSLER CORPORATION, OF DETROIT, MICHIGAN, A CORPORATION OF DELAWARE

OSCILLATING JOINT

Application filed February 17, 1930. Serial No. 429,004.

The main objects of this invention are to provide an improved oscillating joint; to provide a joint which is particularly adapted for the spring shackles and shock absorber riggings of motor vehicles; to provide an improved yieldable connection between movable parts of a joint of this kind; to provide improved means for frictionally securing the relatively movable parts of the joint to the yieldable connection so as to prevent axial movement of one part with respect to the other; and to provide a thin film or coating of rubber having a rigid bond with the surfaces of the movable parts of the joint between which the yieldable connection is located.

An illustrative embodiment of the invention is shown in the accompanying drawing, in which:

Fig. 1 is a fragmentary section of an oscillating joint embodying our invention.

Fig. 2 is a transverse section taken on line 2—2 of Fig. 1.

Fig. 3 is an elevation, partly in section, illustrating a yieldable element of an oscillating joint as it appears before the parts thereof are assembled.

Fig. 4 is a section similar to Fig. 2 showing a further development of our invention.

Heretofore in oscillating joints of the type which have a yieldable connecting member between the relatively movable metal parts, it has been found that one metal part shifts axially relative to the other during operation. This axial movement brings adjacent metallic surfaces of the structure in which the joint is employed into rubbing engagement with each other creating grinding noises and squeaks which are objectionable, particularly in motor vehicles. The movement of the elements of a joint of this kind also throws the parts of the structure to which it is attached out of alignment.

It has been found that by rigidly securing a thin coating or film of material having a high coefficient of friction on the surfaces of the relatively movable parts of the joint with which the yieldable connecting material engages, this undesirable axial movement is obviated.

In the form shown, the oscillating joint is illustrated in connection with a spring shackle and comprises an outer sleeve 1 and an inner sleeve 2, the end portions 3 and 4 of which extend beyond the extremities of the outer sleeve 1. A bolt 5 passes through the inner sleeve 2 and firmly clamps a pair of shackle bars 6 and 7 on its extremities. The outer sleeve 1 is firmly mounted in an eye 8 of a support or bracket 9.

Formed on the outer periphery of the inner sleeve 2 is a film or coating 10 of rubber or other material having a high coefficient of friction. The coating 10 is rigidly secured to the periphery of the sleeve 2 by vulcanization or in any suitable manner. When a rubber composition is employed for this purpose it may be formed by a spraying, painting, dipping or electrodeposition process.

The sleeves 1 and 2 are yieldably connected together by a cylinder 11 preferably comprising compressed rubber. In assembling the joint, a rubber ring 12 of the shape shown in Fig. 3, is forced by hydraulic pressure or other suitable means between the inner and outer peripheries of the sleeves 1 and 2. The insertion of the rubber may be facilitated by the use of a cone shaped device 13 on the end of the inner tube 2 and a frusto-conical member 14 on the end of the sleeve 1. When the ring 12 has been fully inserted it assumes the shape of the cylinder 11 as shown in Fig. 1.

In the form of our invention shown in Fig. 4, the inner sleeve 2' has a coating 10' on its outer periphery similar to the coating 10 of Fig. 1. The inner periphery of the outer sleeve 1' has a similar coating 15 comprising material having a high coefficient of friction. Between these two coatings is located a connecting member 11' which is identical with the cylinder 11 illustrated in Fig. 1. With this form of our invention, frictional resistance to axial movement of both sleeves is provided by the coatings 10' and 15.

Although but two specific embodiments of our invention are herein shown and described, it will be understood that various changes including the size, shape and arrangement of parts may be made without departing from the spirit of our invention and it is not our intention to limit its scope other than by the terms of the appended claims.

We claim:

1. An oscillating joint comprising an inner member, a rigid support surrounding said member having an inner wall spaced from the surface thereof, a composition coating fixed on said inner member having a relatively high coefficient of friction, and yieldable means under compression between said support and member forming a connection therebetween and coacting frictionally with said coating to hold said yieldable means against both linear and rotary movement relative to said inner member.

2. An oscillating joint comprising an inner sleeve, a support surrounding said sleeve having an inner wall spaced from the periphery of said sleeve, a rubber coating on and rigidly bonded with the outer periphery of said sleeve, and a yieldable connecting element under compression between said support and coating comprising rubber frictionally coacting with said coating to hold said connecting element against both linear and rotary movement relative to said inner sleeve.

3. An oscillating joint comprising a pair of sleeves, one located within the other, rubber coatings on and rigidly bonded to the adjacent peripheries of said sleeves, and a cylinder compressed between said sleeves comprising rubber, said cylinder being under compression and in frictional engagement with said coatings for preventing relative axial movement of said sleeves.

4. In a spring support, a sleeve surrounded by the walls of said support and extending beyond the sides thereof, a pair of shackle bars, one adjacent each end of said sleeve and having an aperture in registration with said sleeve, rubber coatings, one rigidly bonded to the adjacent surfaces of said support and sleeve respectively, rubber compressed between said coatings forming a yieldable connection between said sleeve and support and having frictional engagement with said coatings, and a bolt extending through said sleeve and apertures firmly clamping said shackle bars on the ends of said sleeve.

ROGER K. LEE.
CARROLL L. HUMPHREY.